United States Patent
Gövert

(10) Patent No.: US 10,589,333 B2
(45) Date of Patent: Mar. 17, 2020

(54) METHOD FOR PRODUCING A JOINT OUTER PART, JOINT OUTER PART, AND TOOL

(71) Applicants: THYSSENKRUPP STEEL EUROPE AG, Duisburg (DE); thyssenkrupp AG, Essen (DE)

(72) Inventor: Michael Gövert, Dortmund (DE)

(73) Assignee: thyssenkrupp AG, Essen (DE)

(*) Notice: Subject to any disclaimer, the term of this patent is extended or adjusted under 35 U.S.C. 154(b) by 144 days.

(21) Appl. No.: 15/753,522

(22) PCT Filed: Jul. 21, 2016

(86) PCT No.: PCT/EP2016/067380
§ 371 (c)(1),
(2) Date: Feb. 19, 2018

(87) PCT Pub. No.: WO2017/029064
PCT Pub. Date: Feb. 23, 2017

(65) Prior Publication Data
US 2018/0236519 A1    Aug. 23, 2018

(30) Foreign Application Priority Data
Aug. 20, 2015    (DE) .................. 10 2015 113 870

(51) Int. Cl.
*B21D 9/10* (2006.01)
*F16D 3/223* (2011.01)
(Continued)

(52) U.S. Cl.
CPC ............. *B21D 9/10* (2013.01); *B21D 22/08* (2013.01); *B21D 22/16* (2013.01); *B21D 53/88* (2013.01);
(Continued)

(58) Field of Classification Search
CPC .......... B21D 9/10; B21D 22/08; B21D 22/16; B21D 53/88; F16D 3/223;
(Continued)

(56) References Cited

U.S. PATENT DOCUMENTS 6,132,316 A    10/2000    Statham
6,224,490 B1    5/2001    Iihara
(Continued)

FOREIGN PATENT DOCUMENTS

CN    102954120 A    3/2013
DE    10325116 A    1/2005
(Continued)

OTHER PUBLICATIONS

English Translation of International Search Report issued in PCT/EP2016/067380, dated Oct. 26, 2016 (dated Nov. 4, 2016).

*Primary Examiner* — John C Hong
(74) *Attorney, Agent, or Firm* — RMCK Law Group PLC

(57) ABSTRACT

A method for producing a joint outer part by means of flow forming is provided. A blank is arranged on a contour mandrel such that it cannot rotate with respect to the contour mandrel. The contour mandrel is driven in such a way that the blank and the contour mandrel rotate about a common axis. The blank is shaped at least partially with the aid of a flow forming roller which acts on the blank in order to form the joint outer part. At least one track is formed with a concave region in the joint outer part.

10 Claims, 5 Drawing Sheets

(51) Int. Cl.
*B21D 22/16* (2006.01)
*B21D 53/88* (2006.01)
*B21D 22/08* (2006.01)

(52) U.S. Cl.
CPC .... *F16D 3/223* (2013.01); *F16D 2003/22309* (2013.01); *F16D 2250/0023* (2013.01); *F16D 2300/06* (2013.01)

(58) Field of Classification Search
CPC ... F16D 2250/0023; F16D 2003/22309; F16D 2300/06
See application file for complete search history.

(56) References Cited

U.S. PATENT DOCUMENTS 7,000,319 B2 * 2/2006 Iihara .................... B21K 1/762
29/898
2015/0184698 A1 7/2015 Govert

FOREIGN PATENT DOCUMENTS

| | | |
|---|---|---|
| DE | 102006030661 A | 1/2008 |
| DE | 102007048328 A | 7/2008 |
| DE | 102012105958 A | 1/2014 |
| DE | 102013101555 B | 5/2014 |
| DE | 102012112823 A | 6/2014 |
| DE | 102013110528 A | 3/2015 |
| JP | H09133149 A | 5/1997 |

* cited by examiner

METHOD FOR PRODUCING A JOINT OUTER PART, JOINT OUTER PART, AND TOOL

CROSS REFERENCE TO RELATED APPLICATIONS

This application is a U.S. National Stage Entry of International Patent Application Serial Number PCT/EP2016/067380, filed Jul. 21, 2016, which claims priority to German Patent Application No. DE 10 2015 113 870.0, filed Aug. 20, 2015, the entire contents of both of which are incorporated herein by reference.

FIELD

The present disclosure generally relates to methods for producing joint outer parts.

BACKGROUND

A flow forming method is known, for example, from DE 10 2013 101 555 B3. In the flow forming, a workpiece is formed by way of the use of rollers at high pressures and low temperatures in comparison with other reshaping methods. By virtue of the fact that the flow forming method is carried out at temperatures below the material-specific recrystallization temperature, high work hardening occurs in the workpiece in comparison with other reshaping methods. By means of flow forming, joint outer parts of, for example, constant velocity joints can be produced with a considerably reduced weight and an optimized use of material. Joint outer parts which are produced by means of flow forming have the advantage, in particular, in comparison with forged and therefore stiffer joint outer parts that all balls of the constant velocity joint are uniformly loadbearing as a result of the elasticity of the joint outer part which is produced by means of flow forming, that is to say the load which is to be supported by the balls is distributed uniformly to the balls.

Thus a need exists for a simple and inexpensive method for producing a joint outer part for a joint with an increased service life in comparison with the prior art.

DETAILED DESCRIPTION

Figure 1:
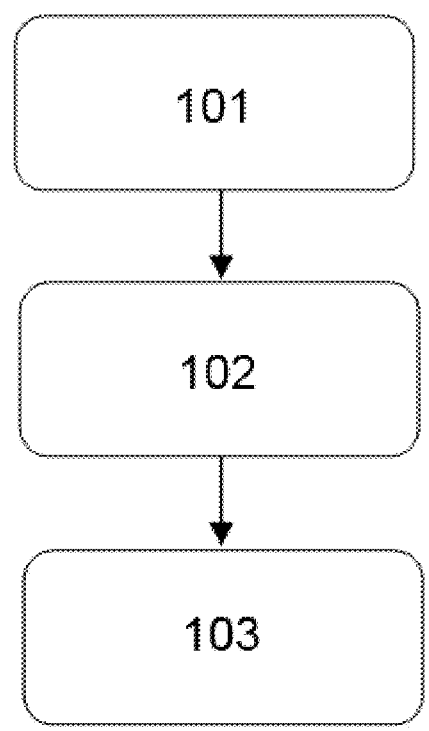
FIG. 1 is a flowchart depicting an example method.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns methods for producing a joint outer part by means of flow forming. In some examples, a blank may be arranged on a contour mandrel such that it cannot rotate with respect to the contour mandrel in a first method step. The contour mandrel may be driven in a second method step such that the blank and the contour mandrel rotate about a common axis. And the blank may be shaped at least partially with the aid of a flow forming roller that acts on the blank to form the joint outer part in a third method step.

In some examples, a blank may be arranged on a contour mandrel such that it cannot rotate with respect to the contour mandrel in a first method step, the contour mandrel being driven in a second method step in such a way that the blank and the contour mandrel rotate about a common axis, the blank being shaped at least partially with the aid of a flow forming roller which acts on the blank in order to form the joint outer part in a third method step, wherein, in the third method step, at least one track is formed with a concave region in the joint outer part.

The method according to the invention for producing a joint outer part has the advantage in comparison with the prior art that additional grease pockets can be provided in the joint outer part with the aid of the concave region. Said additional grease pockets can serve as an additional lubricant reservoir of the joint and can therefore improve the lubrication of the joint outer part with respect to further joint components. As a result of an improved lubrication of the joint outer part with respect to further joint components, the service life both of the joint outer part and of the entire joint is improved.

The concave regions are provided, for example, in non-loadbearing regions in the inner contour of the joint outer part. One advantage is that the loadbearing regions of a joint outer part which is produced by way of the method according to the invention can therefore be produced in a dimensionally accurate manner more simply, and subsequent machining can therefore be dispensed with. By virtue of the fact that, for example, all or most of the non-loadbearing regions are of concave configuration and therefore the loadbearing functional regions of the tracks are present in an elevated manner in comparison with the concave regions, a hardening process of the loadbearing functional regions can be optimized in a simple way, furthermore, since merely the regions which are present in an elevated manner in comparison with the concave regions have to be hardened, in order to ensure an optimum joint function. Within the context of the invention, the track being formed with a concave region in the joint outer part means, in particular, that the formed track comprises a track face, a concave region being additionally configured in the track face.

Advantageous refinements and developments of the invention can be gathered from the subclaims and the description with reference to the drawings.

It is provided according to one preferred embodiment of the present invention that, in the third method step, a ball track is formed with the concave region in the joint outer part. As a result, additional grease pockets can be provided in the ball track in an advantageous way. The lubrication between the balls and the joint outer part can therefore be improved and/or the friction between the balls and the joint outer part can be reduced by way of the provision of additional grease or lubricant in the grease pockets in the ball track. Furthermore, the hardening process of the non-concave regions, that is to say, for example, of the load-bearing regions, of the ball track can be optimized in an advantageous way, since merely the regions which are elevated in comparison with the concave regions have to be hardened, in order to ensure an optimum joint function. As a result, the service life, in particular of the ball track or the ball tracks in the joint outer part, is increased. Moreover, the service life of the balls and of the ball tracks in a joint inner part of the joint is therefore also increased.

It is provided according to one preferred embodiment of the present invention that, in the third method step, a cage track is formed with the concave region in the joint outer part. As a result, additional grease pockets can be provided in the cage track in an advantageous way. The lubrication between the cage and the joint outer part can therefore be improved and/or the friction between the cage and the joint outer part can be reduced by way of the provision of additional grease or lubricant in the grease pockets in the cage track. Moreover, the hardening process of the non-concave regions of the cage track can be optimized in an advantageous way, since merely the regions which are elevated in comparison with the concave regions have to be hardened, in order to ensure an optimum joint function. As a result, the service life, in particular, of the cage track or the cage tracks in the joint outer part and of the cage itself is increased.

It is provided according to one preferred embodiment of the present invention that, in the third method step, the track is formed with the aid of a rolling beam. As a result of the use of a rolling beam or a plurality of rolling beams, complex surface structures and faces can be produced in the joint outer part in a simple and inexpensive way. Concave regions or else lubricant reservoirs of different configuration can therefore be formed in the track in a simple way.

It is provided according to one preferred embodiment of the present invention that, in the third method step, a structure edge is formed between the ball track and the cage track. As a result, a delimitation between the ball track or the ball tracks and the cage track is formed in a simple and inexpensive way. Furthermore, simple guidance of the ball or balls and of the cage is therefore provided.

A further subject matter of the present invention is a joint outer part having a track, in particular produced by way of the method according to the invention, the at least one track comprising a concave region. A simple, inexpensive and mechanically robust joint outer part is produced as a result. Furthermore, an additional grease pocket or additional grease pockets is/are provided in the joint outer part with the aid of the concave region. Said additional grease pockets can serve as an additional lubricant reservoir of the joint and can therefore improve the lubrication of the joint outer part with respect to further joint components. As a result of an improved lubrication of the joint outer part with respect to further joint components, the service life both of the joint outer part and of the entire joint is improved.

It is provided according to one preferred embodiment of the present invention that the track is a ball track. As a result, an additional grease pocket or additional grease pockets is/are provided in the ball track in an advantageous way. As a result of the provision of additional grease or lubricant in the grease pockets in the ball track, the lubrication between the balls and the joint outer part can therefore be improved and/or the friction between the balls and the joint outer part can be reduced. Furthermore, the hardening process of the non-concave regions, that is to say, for example, of the loadbearing regions, of the ball track can be optimized in an advantageous way, since merely the regions which are elevated in comparison with the concave regions have to be hardened, in order to ensure an optimum joint function. As a result, the service life, in particular of the ball track or the ball tracks in the joint outer part, is increased.

It is provided according to one preferred embodiment of the present invention that the track is a cage track. As a result, additional grease pockets are provided in the cage track in an advantageous way. As a result of the provision of additional grease or lubricant in the grease pockets in the cage track, the lubrication between the cage and the joint outer part can therefore be improved and/or the friction between the cage and the joint outer part can be reduced. Moreover, the hardening process of the non-concave regions of the cage track can be optimized in an advantageous way, since merely the regions which are elevated in comparison with the concave regions have to be hardened, in order to ensure an optimum joint function. As a result, the service life, in particular of the cage track or the cage tracks in the joint outer part, is increased.

A further subject matter of the present invention is a tool for producing a joint outer part by means of flow forming, in particular by way of the method according to the invention, the tool comprising a contour mandrel for receiving a blank in a manner which is secured against rotation with respect to the contour mandrel, the tool comprising a drive for driving the contour mandrel in such a way that the blank and the contour mandrel can be rotated substantially about a common axis, the tool comprising a flow forming roller which acts on the blank in order to form at least one track with a concave region in the joint outer part. As a result, a tool is provided in an advantageous way for producing a joint outer part, in particular by way of the method according to the invention, having the advantages of the method according to the invention and the joint outer part according to the invention.

It is provided according to one preferred embodiment of the present invention that the tool comprises a rolling beam for forming the at least one track. It is provided, in particular, that the tool comprises a plurality of rolling beams of different configuration. As a result of the use of a rolling beam or a plurality of rolling beams, complex surface structures and faces can be produced in the joint outer part in a simple and inexpensive way.

Figure 2:
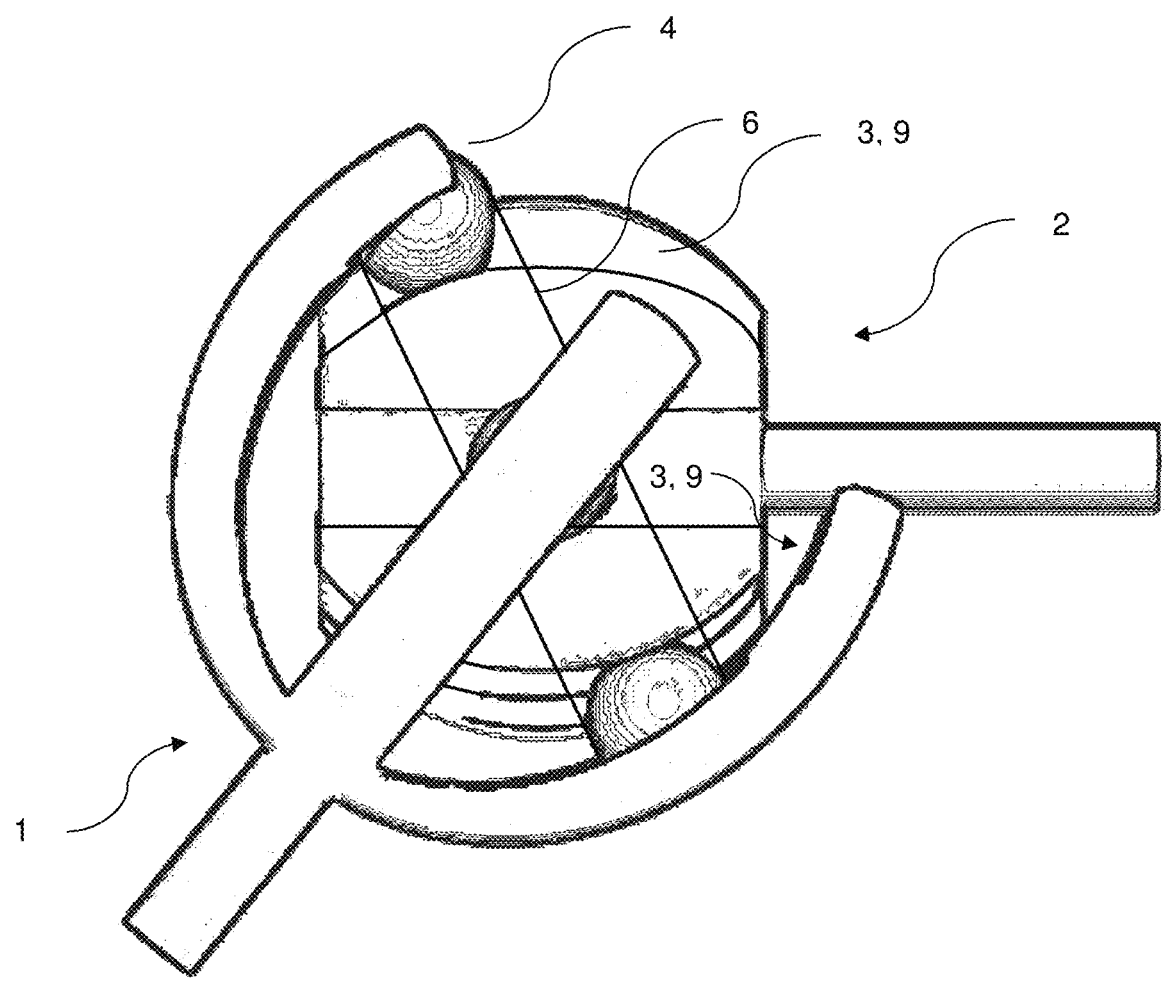
FIG. 2 is a diagrammatic perspective view of an example joint with a joint inner part and a joint outer part.
Figure 3:
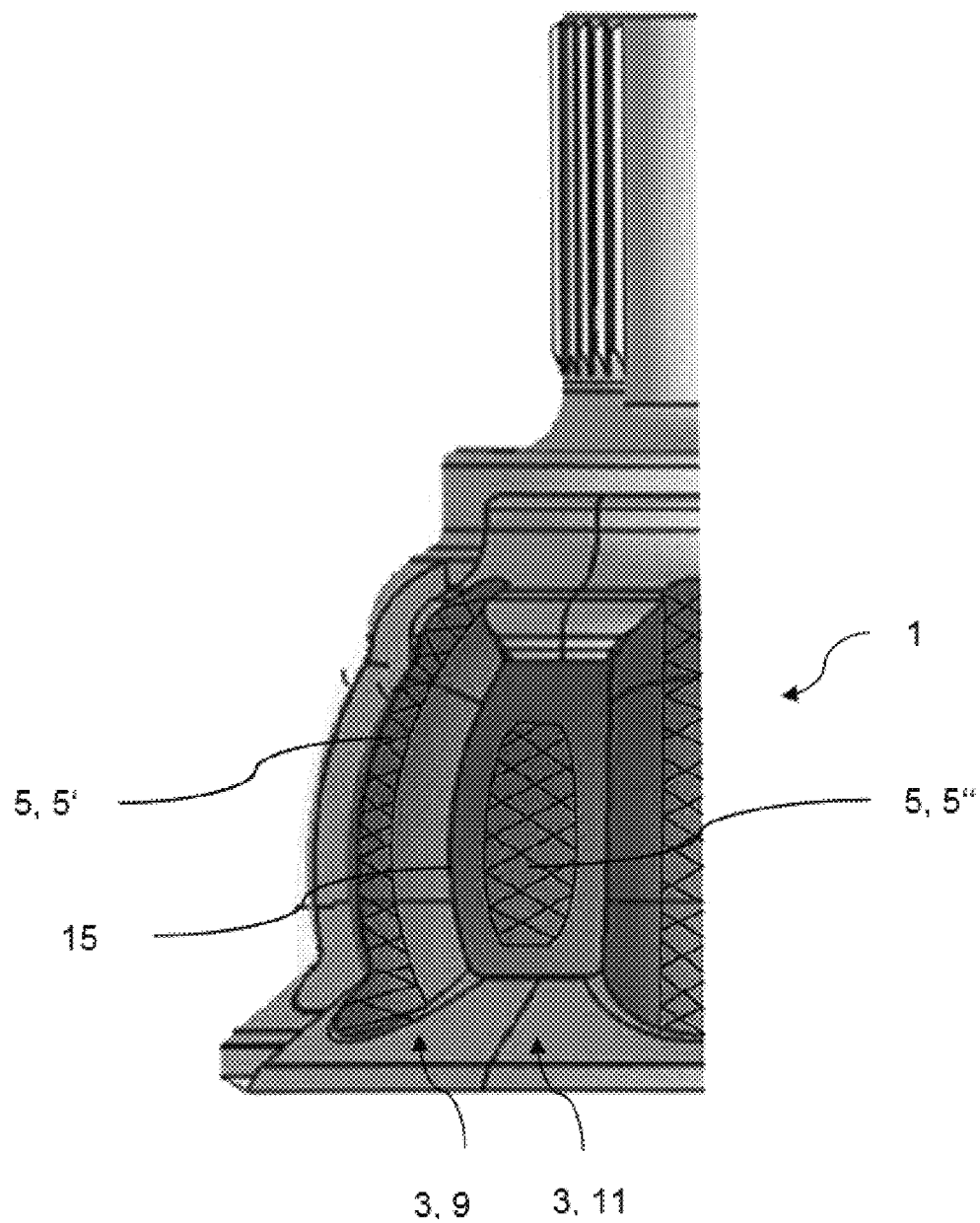
FIG. 3 is a diagrammatic, partial perspective view of an example joint outer part where concave regions of ball tracks and a cage track are shown in a hatched manner.
Figure 4:
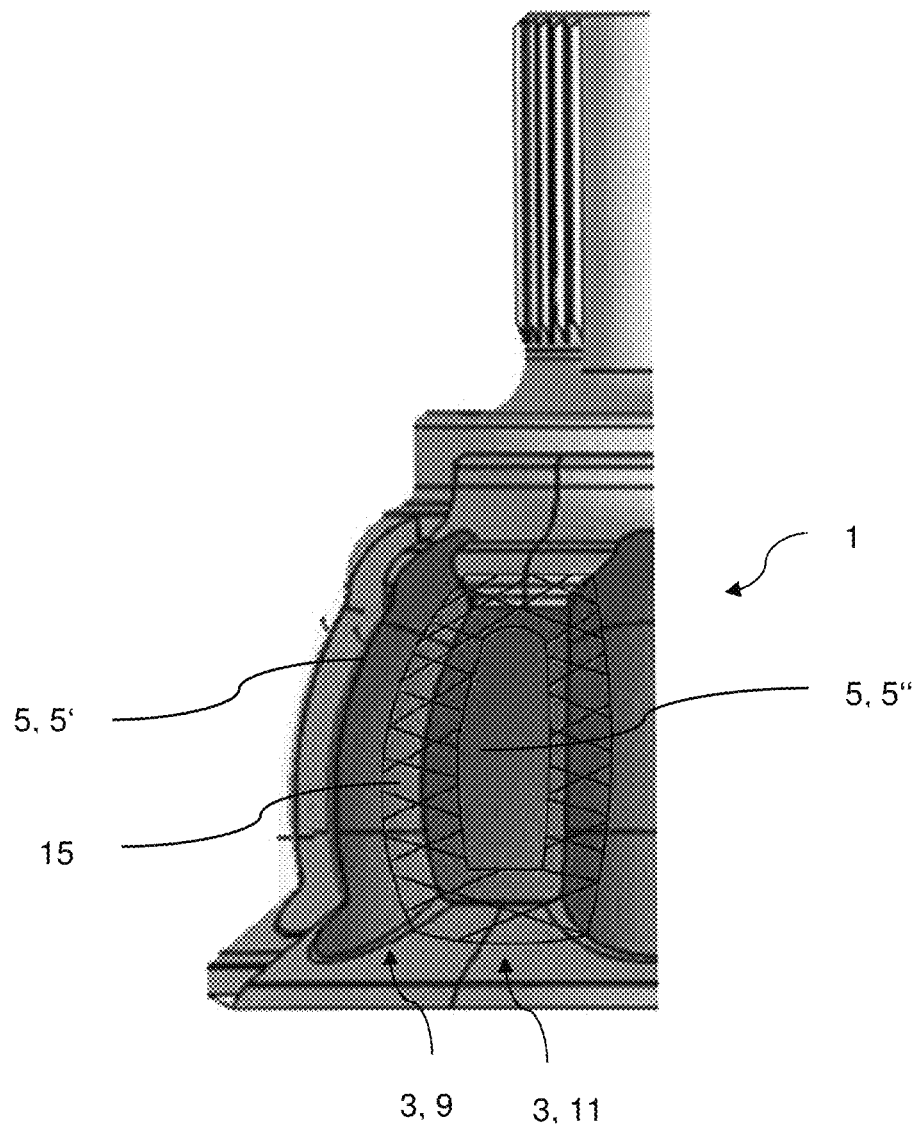
FIG. 4 is a diagrammatic, partial perspective view of an example joint outer part where non-concave regions of ball tracks and a cage track are shown in a hatched manner.
Figure 5:
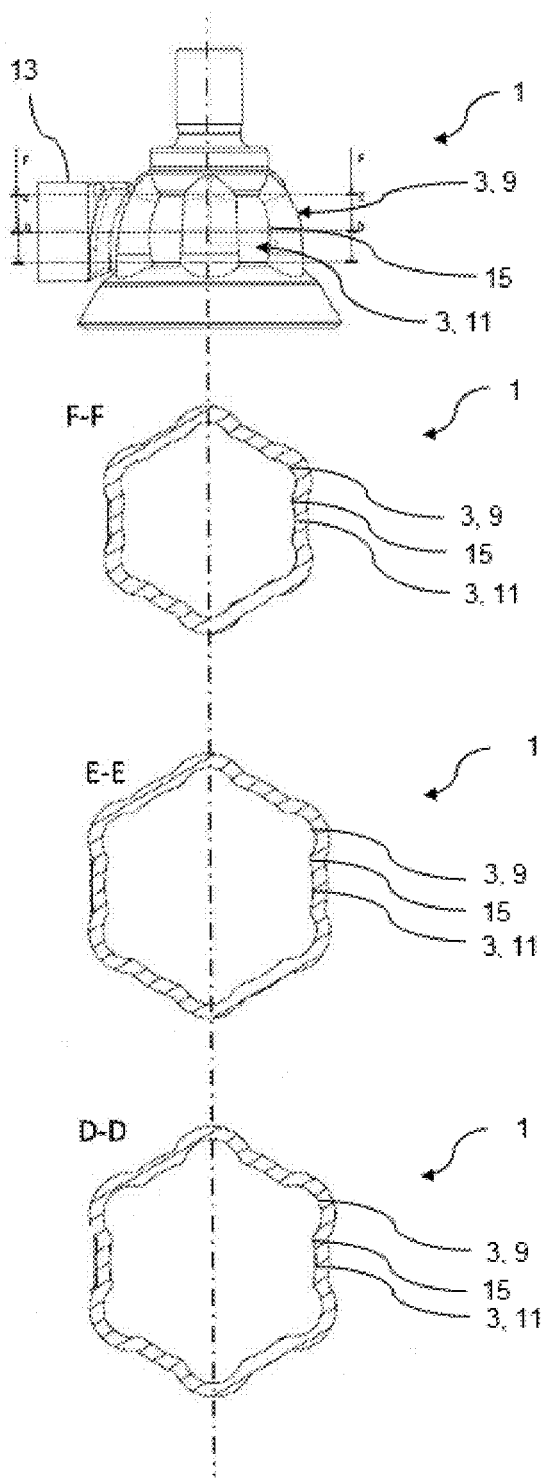
FIG. 5 is a diagrammatic perspective view with corresponding sectional views of an example joint outer part that corresponds substantially to the example joint outer part shown in FIGS. 3 and 4.

FIG. 1 shows a flowchart in accordance with one exemplary method for producing joint outer parts 1 which are shown in FIG. 2, FIG. 3, FIG. 4 and FIG. 5 by means of flow forming. In the case of the method which is shown here, a blank is arranged on a contour mandrel such that it cannot rotate with respect to the contour mandrel in a first method step 101. The contour mandrel comprises, for example, a plurality of contour mandrel parts, with the result that undercuts can also be realized in the joint outer part 1. In particular, the contour mandrel is formed in such a way that the outer face of the contour mandrel corresponds substantially to the inner contour of the joint outer part 1. In a second method step 102, the contour mandrel is driven in such a way that the blank and the contour mandrel rotate about a common axis. In a third method step 103, the blank is shaped at least partially with the aid of a flow forming roller which acts on the blank substantially perpendicularly with respect to the common axis in order to form the joint outer part 1. It is also provided, for example, that the flow forming roller acts on the blank substantially parallel to the common axis. It is also conceivable that the blank and the contour mandrel are mounted such that they can be rotated merely about a common axis, and the drive takes place with the aid of the flow forming roller or the flow forming rollers. In the third method step 103, in particular, at least one track 3 is formed with a concave region 5 in the joint outer part 1. In the third method step 103, for example, at least one ball track 9 which is shown in FIG. 3, FIG. 4 and FIG. 5 is formed with the concave region 5' in the joint outer part 1.

In the third method step 103, in addition or as an alternative, for example, a cage track 11 which is shown in FIG. 3, FIG. 4 and FIG. 5 is formed with the concave region 5" in the joint outer part 1. In the third method step 103, for example, the track 3 is formed with the aid of a rolling beam 13 which is shown in FIG. 5. Furthermore, in the third method step 103, for example, a structure edge 15 which is shown in FIG. 3, FIG. 4 and FIG. 5 is formed between the ball track 9 and the cage track 11.

FIG. 2 shows a joint with a joint outer part 1 and with a joint inner part 2. A joint of this type is also called a constant velocity joint and transmits the angular velocity and the torque uniformly from a shaft of the joint outer part 1 to a shaft of the joint inner part 2 or from the shaft of the joint inner part 2 to the shaft of the joint outer part 1 with the aid of balls 4. During operation of the constant velocity joint, said balls 4 move in each case along at least one track 3 or one ball track 9 in the joint outer part 1 and along at least one track 3 or ball track 9 in the joint inner part 2. A superimposition of sliding friction and rolling friction occurs between the balls 4 and the joint outer part 1 and between the balls 4 and the joint inner part 2 as a result of the relative movement of the joint outer part 1 with respect to the joint inner part 2. Said superimposition is also called rolling friction. Satisfactory lubrication of constant velocity joints is necessary in order to minimize said rolling friction. The service life of joints is increased significantly by way of optimized lubrication. FIG. 2 diagrammatically shows a cage 6 which additionally defines the relative spacings of the balls 4 from one another. FIG. 2 does not show a cage track 11 for an improved view of the method of operation of the constant velocity joint.

The joint outer part 1 (shown partially in FIG. 3 and FIG. 4) of a constant velocity joint is preferably produced by way of the method according to the invention, other production methods also being provided for producing the joint outer part 1. The joint outer part 1 which is shown in FIG. 3 and FIG. 4 comprises a cage track 11 which by way of six ball tracks 9 with in each case one concave region 5. Here, each of the six ball tracks 9 comprises a concave region 5', and the cage track 11 comprises a concave region 5". In FIG. 3, the concave regions 5' and 5" of the ball tracks and the cage track are shown in a hatched manner. In FIG. 4, in contrast, the regions which are elevated with respect to the concave regions or the non-concave regions of the ball tracks and the cage track are shown in a hatched manner. In the exemplary embodiment which is shown here, the non-concave regions of the ball tracks 9 are the loadbearing regions or the regions which guide the balls 4 and transmit the angular velocity and the torque uniformly. The lubrication between the balls 4 and the non-concave regions of the ball tracks is improved by way of the provision of grease in the concave regions 5'. Furthermore, additional lubricant reservoirs are provided in the concave regions 5" of the cage track. Said lubricant reservoirs provide additional lubricant for the lubrication of the constant velocity joint. Non-concave regions of the cage track 11 in each case directly adjoin the loadbearing regions of the ball tracks 9. Here, respective adjacent loadbearing regions of the ball tracks 9 form a structure edge 15 with the non-concave regions of the cage track 11. The exemplary embodiment which is shown here therefore comprises twelve structure edges 15.

It is advantageously also provided that the ball tracks 9 in the joint inner part 2 which is shown in FIG. 2 and, as an alternative or in addition, those regions of the joint inner part 2 which lie between the ball tracks 9 in each case comprise one or more concave regions 5. As a result, lubricant reservoirs can also be provided on the joint inner part 2, and the service life of constant velocity joints can therefore be increased.

The exemplary embodiment which is shown in FIG. 5 corresponds substantially to the exemplary embodiment which is shown in FIG. 3 and FIG. 4. FIG. 5 additionally shows a rolling beam 13 of an exemplary tool for producing the joint outer part 1 according to the invention. Furthermore, FIG. 5 shows sectional illustrations of the joint outer part 1 along different planes perpendicularly with respect to the rotational axis of the joint outer part. In addition to the contour mandrel or the contour mandrel which comprises a plurality of contour mandrel parts, the tool comprises, for example, a drive for driving the contour mandrel in such a way that the blank and the contour mandrel can be rotated substantially about a common axis. Furthermore, the tool comprises the flow forming roller which acts on the blank substantially perpendicularly with respect to the common axis, for example, in order to form the at least one track 3 with a concave region 5 in the joint outer part 1.

LIST OF DESIGNATIONS

1 Joint outer part
2 Joint inner part
3 Track
4 Ball
5, 5', 5" Concave region
6 Cage
9 Ball track
11 Cage track
13 Rolling beam
15 Structure edge
101 First method step
102 Second method step
103 Third method step

What is claimed is:

1. A method for producing a joint outer part by way of flow forming, the method comprising:
    positioning a blank on a contour mandrel such that the blank is prevented from rotating with respect to the contour mandrel;
    driving the contour mandrel such that the contour mandrel and the blank rotate about a common axis; and
    shaping the blank at least partially with aid of a flow forming roller that acts on the blank to form the joint outer part, the shaping comprising forming at least one ball track having a loadbearing region and a distinct concave region, wherein the loadbearing region is configured to guide the at least one ball and the concave region is configured to accept lubricant.

2. The method of claim 1 wherein the track is a cage track.

3. The method of claim 1 wherein shaping the blank at least partially with the aid of the flow forming roller comprises forming the track with aid of a rolling beam.

4. The method of claim 1 wherein the track is a ball track.

5. The method of claim 4 wherein shaping the blank at least partially with the aid of the flow forming roller comprises forming a cage track in the joint outer part.

6. The method of claim 5 wherein shaping the blank at least partially with the aid of the flow forming roller comprises forming a structure edge between the ball track and the cage track.

7. A joint outer part comprising a ball track having a loadbearing region and a distinct a concave region, wherein the ball track is produced by positioning a blank on a contour mandrel such that the blank is prevented from rotating with respect to the contour mandrel, driving the contour mandrel such that the contour mandrel and the blank rotate about a common axis, and shaping the blank at least partially with aid of a flow forming roller that acts on the blank to form the joint outer part that includes the ball track with the concave region.

8. The joint outer part of claim 7 further comprising a cage track.

9. A tool for producing a joint outer part by way of flow forming, the tool comprising:
   a contour mandrel for receiving a blank in a manner such that the blank is prevented from rotating with respect to the contour mandrel and wherein the blank and the contour mandrel are rotatable about a common axis; and
   a flow forming roller that acts on the blank to form a ball track having a loadbearing region and a distinct concave region in the joint outer part, wherein the loadbearing region is configured to guide the ball and the concave region is configured to accept lubricant.

10. The tool of claim 9 further comprising a rolling beam for forming the track.

* * * * *